United States Patent
Zimmer et al.

(10) Patent No.: US 7,174,451 B2
(45) Date of Patent: Feb. 6, 2007

(54) SYSTEM AND METHOD FOR SAVING AND/OR RESTORING SYSTEM STATE INFORMATION OVER A NETWORK

(75) Inventors: Vincent J. Zimmer, Federal Way, WA (US); Michael A. Rothman, Gig Harbor, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 10/404,508

(22) Filed: Mar. 31, 2003

(65) Prior Publication Data

US 2004/0193863 A1 Sep. 30, 2004

(51) Int. Cl.
*G06F 1/30* (2006.01)

(52) U.S. Cl. .......................... 713/2; 713/300; 713/310; 713/320; 713/321; 713/322; 713/323; 713/324; 713/330; 713/340

(58) Field of Classification Search ................. 713/300, 713/320–324, 1, 2, 310, 330, 340
See application file for complete search history.

(56) References Cited

U.S. PATENT DOCUMENTS

| | | | |
|---|---|---|---|
| 5,349,643 A * | 9/1994 | Cox et al. .................... | 713/155 |
| 5,579,522 A | 11/1996 | Christeson et al. | |
| 5,592,675 A | 1/1997 | Itoh et al. | |
| 5,819,115 A * | 10/1998 | Hoese et al. .................. | 710/68 |
| 5,860,012 A | 1/1999 | Luu | |
| 5,974,547 A * | 10/1999 | Klimenko ...................... | 713/2 |
| 6,101,601 A * | 8/2000 | Matthews et al. ............. | 713/2 |
| 6,226,667 B1 * | 5/2001 | Matthews et al. ............ | 709/203 |
| 6,430,687 B1 * | 8/2002 | Aguilar et al. .................. | 713/2 |
| 6,516,342 B1 * | 2/2003 | Feldman et al. ............. | 709/216 |
| 6,636,963 B1 * | 10/2003 | Stein et al. .................... | 713/1 |
| 6,662,311 B2 | 12/2003 | Itoh et al. | |
| 6,684,327 B1 * | 1/2004 | Anand et al. .................. | 713/2 |
| 6,687,819 B1 * | 2/2004 | Aguilar et al. .................. | 713/2 |
| 6,691,160 B1 * | 2/2004 | Bradley ....................... | 709/222 |
| 6,745,281 B1 * | 6/2004 | Saegusa ....................... | 711/112 |
| 6,877,073 B2 * | 4/2005 | Sanada et al. ............... | 711/152 |
| 6,915,417 B2 * | 7/2005 | Stein et al. .................... | 713/1 |
| 6,996,733 B2 * | 2/2006 | Hershenson et al. ......... | 713/340 |
| 7,000,102 B2 * | 2/2006 | Kumar et al. ................... | 713/2 |
| 7,028,220 B2 * | 4/2006 | Park ............................ | 714/22 |

(Continued)

OTHER PUBLICATIONS

Kolinski, J., et al., "Building the Power-Efficient PC", Intel Corporation 2001, U.S.A., pp/ 19-32.

(Continued)

*Primary Examiner*—A. Elamin
(74) *Attorney, Agent, or Firm*—Blakely, Sokoloff, Taylor & Zafman LLP

(57) ABSTRACT

A system and method to resume execution of a client system from a saved system state without executing a boot-up process. A data storage unit and the client system having volatile system memory are coupled to a network. Data stored on the data storage unit is received via the network and loaded into the volatile system memory of the client system. The data contains information for the client system to resume execution from the saved system state without executing a boot-up process after a power-off state. The client system is then capable of resuming operation from the saved system state.

25 Claims, 5 Drawing Sheets

U.S. PATENT DOCUMENTS

| | | | |
|---|---|---|---|
| 2002/0087854 A1* | 7/2002 | Haigh et al. .................... | 713/1 |
| 2003/0200290 A1* | 10/2003 | Zimmerman et al. ....... | 709/222 |
| 2003/0208675 A1* | 11/2003 | Burokas et al. ................ | 713/1 |
| 2004/0128564 A1* | 7/2004 | Dubinsky ................... | 713/300 |
| 2004/0153694 A1* | 8/2004 | Nicholson et al. ............. | 714/4 |

OTHER PUBLICATIONS http://www.techweb.com/encyclopedia, "ACPI (Advanced Configuration and Power Interface)", TechEncyclopedia, (Feb. 13, 2003).

http://www.techweb.com/encyclopedia, "DHCP (Dynamic Host Configuration Protocol)", TechEncyclopedia, (Feb. 13, 2003).

http://www.techweb.com/encyclopedia, "TFTP (Trivial File Transfer Protocol)", TechEncyclopedia, (Mar. 3, 2003).

http://www.techweb.com/encyclopedia, "remote boot", TechEncyclopedia, (Mar. 5, 2003).

http://searchsecurity.techtarget.com, "IPsec (Internet Protocol Security)", searchSecurity.com Definitions, (Mar. 18, 2003).

http://searchwindosmanageability.techtarget.com, "PXE (Preboot Execution Environment)", searchWindowsManageability.com Definitions, (Mar. 5, 2003).

http://www.techweb.com/encyclopedia, "PXE (Preboot Execution Environment)", TechEncyclopedia, (Mar. 5, 2003).

http://www.techweb.com/encyclopedia, "GUID (Globally Unique Identifier)", TechEncyclopedia, (Mar. 3, 2003).

* cited by examiner

SYSTEM AND METHOD FOR SAVING AND/OR RESTORING SYSTEM STATE INFORMATION OVER A NETWORK

TECHNICAL FIELD

This disclosure relates generally to saving and/or restoring system state information over a network, and in particular but not exclusively, relates to saving and/or restoring system state information in a diskless environment.

BACKGROUND INFORMATION

Computers have become a ubiquitous tool in a modern office environment. As such, equipping each office employee in a large office environment with a personal desktop computer (also known as a workstation in an office environment) can require a large capital investment. In addition to the initial capital investment, maintaining and servicing each workstation requires additional and continual capital expenditures.

An expensive component of a workstation is a hard disk, both in terms of initial purchase cost and repair/replacement costs. A hard disk is an electromechanical device having components continually in motion. Because moving mechanical parts are inherently more prone to failure than electronic components, hard disks are a regular source of workstation failure. Accordingly, diskless workstations have been developed to overcome the above drawbacks associated with hard disks. Diskless workstations eliminate drive read errors and tend to be less expensive with enhanced reliability.

To be useful, a workstation must be able to send, receive and store information. Thus, diskless workstations may optionally include an inexpensive floppy disk drive to allow a user of the diskless workstation to save data to and/or load data from. However, floppy disk drives generally do not provide sufficient storage capacity to hold an operating system ("OS") for the diskless workstation to boot from and even to store ordinary files, such as image files. Accordingly, diskless workstations are generally coupled to a network, such as a local area network ("LAN").

Preboot execution environment ("PXE") refers to an Intel™ Wired for Management capability that enables an IBM™-compatible computer, typically running Windows™, to boot-up from a server over a network, without the need for an internal hard disk or boot diskette. PXE is generally supported in basic input output system ("BIOS") firmware. A diskless workstation with PXE enabled BIOS firmware can receive OS boot files from the server over the network. With these OS boot files the diskless workstation can boot-up and commence regular OS runtime operation.

A current drawback of the diskless workstation environment is the inability to perform power management functions that entail deep power cycles, such as suspend-to-disk. Without an internal hard disk, the current diskless workstations are unable to retain the contents of system memory through a deep power cycle. Thus, each time a diskless workstation is powered-off, reset, or power is otherwise removed from the system memory, current diskless workstations must execute a complete boot-up process over the network to return to regular OS runtime operation.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for saving and/or restoring system state information over a network are described herein. In the following description numerous specific details are set forth to provide a thorough understanding of embodiments of the invention. One skilled in the relevant art will recognize, however, that embodiment of the invention can be practiced without one or more of the specific details, or with other methods, components, materials, etc. In other instances, well-known structures, materials, or operations are not shown or described in detail in order not to obscure the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "diskless computer" is defined to include a processing system, whether used in an office environment or a home environment, which does not have an internal hard disk or an externally attached hard disk (e.g., USB plug and play hard disk or the like). A diskless computer may optionally include a floppy disk drive, CD-ROM drive, a ZIP drive, or the like. A diskless computer may even include a network adapter coupled to a network, which is in turn coupled to a storage device, such as a stand-alone network hard disk.

Embodiments of a system and method for saving and/or restoring system state information over a network are described herein. Embodiments of the present invention are capable to receive a system state image via a network. The system state image enables a client system to resume execution from a saved system state without executing a boot-up process after a power-off state of the client system. Embodiments of the present invention are further capable to save a system state image to a data storage unit via the network to later retrieve the saved system state image and resume execution without first executing a boot-up process after a power-off state. These and other embodiments and additional features of the present invention are described in detail below.

Figure 1:
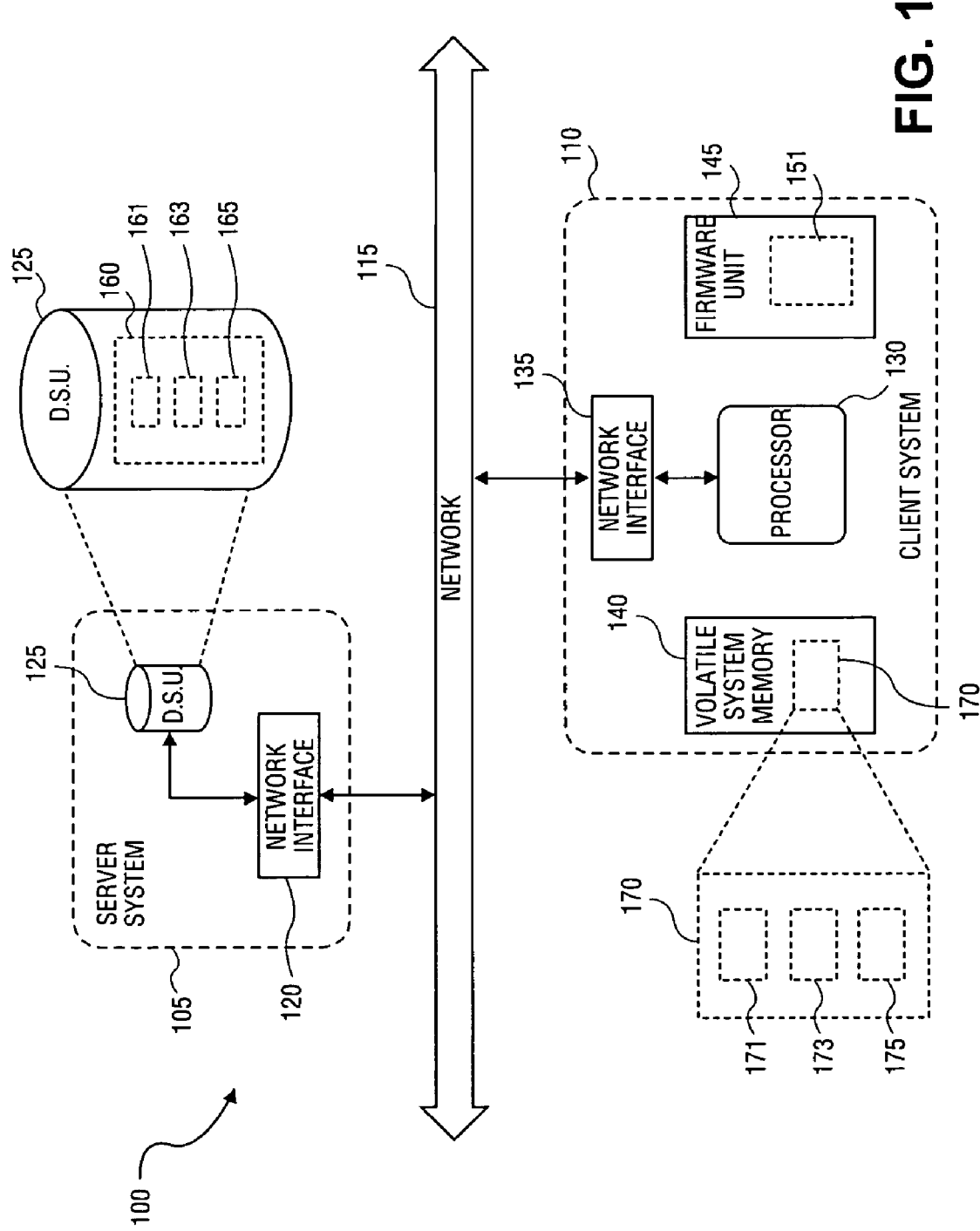
FIG. 1 is a block diagram illustrating a system to save a system state and/or restore the system state over a network, in accordance with an embodiment of the present invention.

FIG. 1 is a block diagram illustrating a networked system 100 to save a system state and/or restore the system state over a network, in accordance with an embodiment of the present invention. In one embodiment, networked system 100 includes a server system 105 communicatively coupled to a client system 110 via a network 115. In the illustrated embodiment, server system 105 includes a network interface 120 and a data storage unit 125. In the illustrated embodiment, client system 110 includes a processor 130, a network interface 135, a volatile system memory unit 140, and a firmware unit 145.

The elements of networked system 100 are interconnected as follows. Network interface 120 is communicatively coupled to network 115 to enable server system 105 to communicate across network 115. Data storage unit 125 is communicatively coupled to network interface 120 and functions as a network data repository to store data and to make data available to network 115. Network interface 135 is communicatively coupled to network 115 to enable client system 110 to communicate across network 115 and to store data to and to retrieve data from data storage unit 125. Network 115 may include a wired or wireless local area network ("LAN"), a wide area network, or the Internet.

Processor 130 of client system 110 may represent a central processing unit ("CPU"), an application specific integrated circuit, or the like, capable of executing software instructions. Processor 130 is coupled to network interface 135 to send and to receive data over network 115. Data received via network interface 135 may be transferred into volatile system memory 140 and from there executed or otherwise manipulated by processor 130. In one embodiment, volatile system memory includes system random access memory.

Processor 130 is further coupled to firmware unit 145 to receive firmware instructions 151 therefrom. Firmware instructions 151 may include a basic input output system ("BIOS"), instructions for executing a power-on self-test ("POST"), and the like. In one embodiment, firmware instructions 151 include instructions compatible with an Extensible Firmware Interface ("EFI") Specification, Version 1.10, Dec. 1, 2002, or later. Firmware unit 145 may include any nonvolatile memory device, but generally refers to devices such as a programmable read only memory device, an erasable programmable read only memory device, an electrically erasable programmable read only memory device, a flash memory device, or the like.

In one embodiment, data storage unit 125 includes a memory device internal to server system 105, such as an IDE hard disk, an EIDE hard disk, a SCSI hard disk, a tape drive or the like. Although data storage unit 125 is illustrated as internal to server system 105, data storage unit 125 may be external to server system 105 or even coupled directly to network 115, such as a stand-alone network hard disk. Furthermore, although only a single data storage unit 125 is illustrated, multiple data storage units 125 may be used, such as in the case of a redundant array of independent disks ("RAID") coupled to a RAID controller. Data storage unit 125 may be controlled directly by server system 105 or controlled remotely via network 115 in the case where data storage unit 125 represents a stand-alone network hard disk. In yet another embodiment, client system 110 may access data storage unit 125 directly without need of server system 105.

Server system 105 may include other elements of a typical computer system or network server, such as a CPU and one or more disk drives (e.g., floppy disk drive, CD-ROM drive, and the like), but have been excluded from FIG. 1 for the sake of clarity. Similarly, client system 110 may include other typical element of a computer system, but have also been excluded for the sake of clarity. Although the thrust of this disclosure is directed for use in a diskless environment and intended to maximized the benefits derived therefrom, embodiments of client system 110 may optionally include an internal or attached hard disk. Typical examples of client system 110 include, but are not limited to, diskless computers, diskless workstations, personal digital assistants, and the like.

Figure 2A:
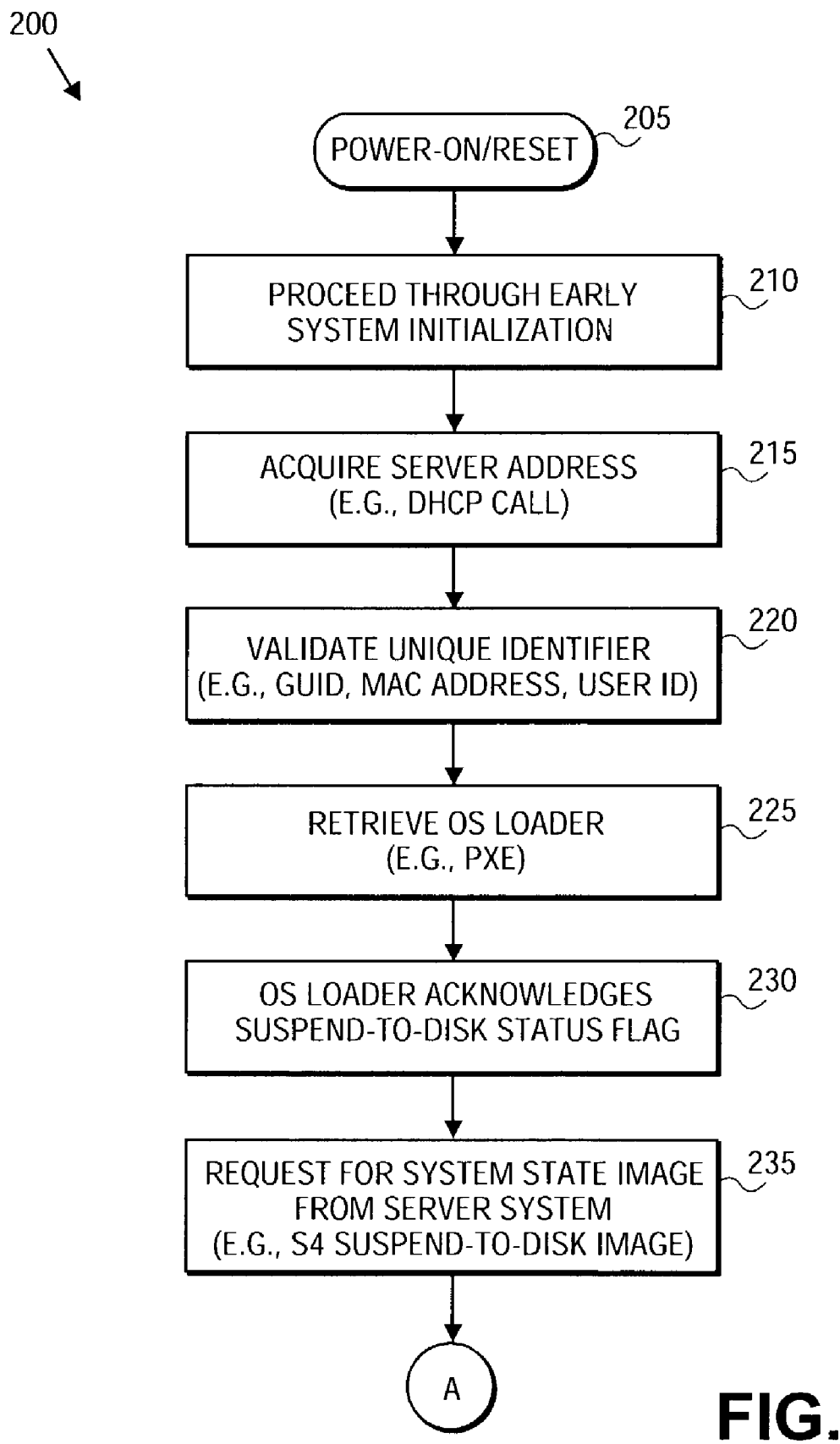
FIGS. 2A and 2B are a flow diagram illustrating a method to restore a saved system state and/or a generic system state over a network, in accordance with an embodiment of the present invention.
Figure 2B:
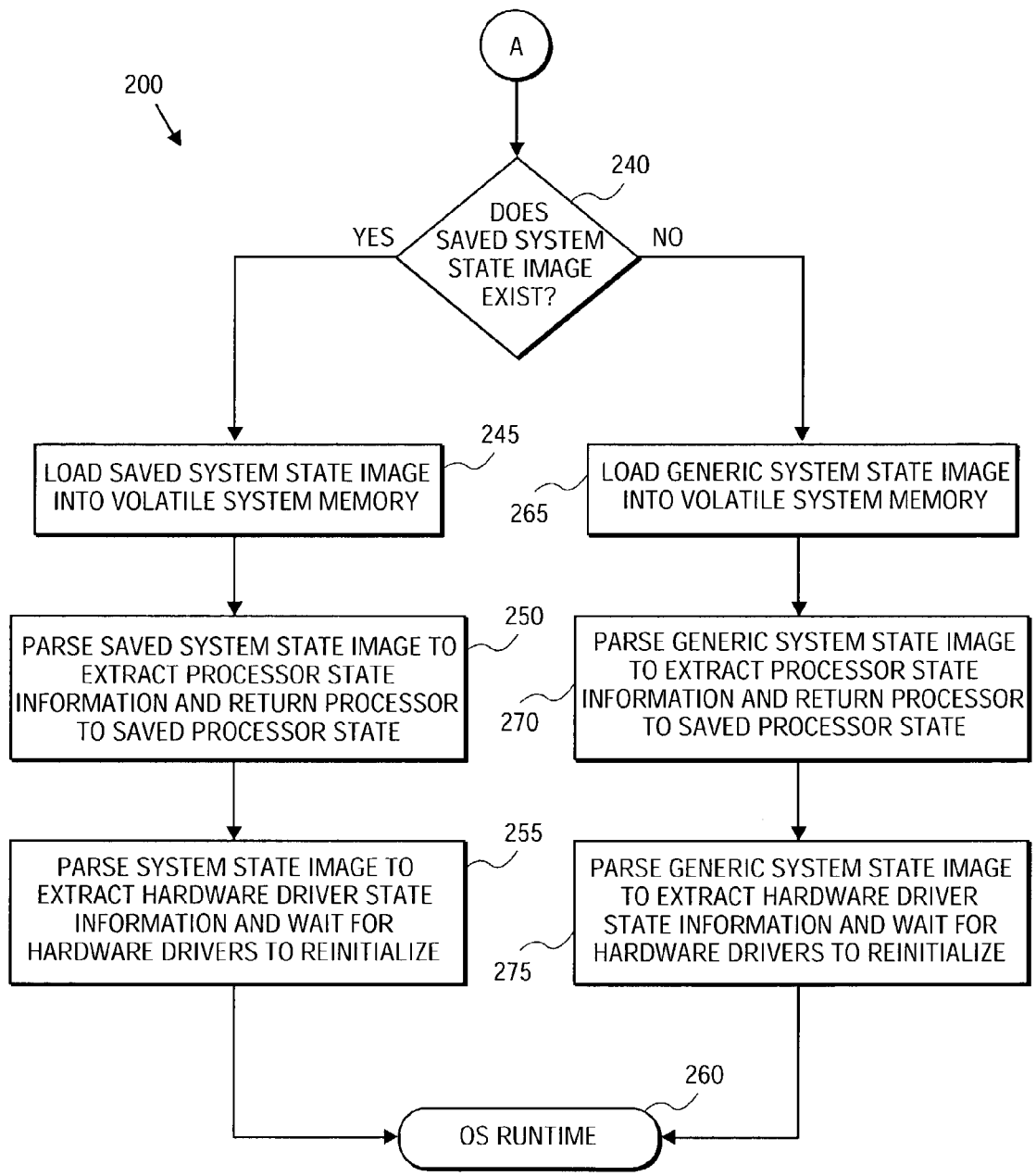

Turning now to FIGS. 1, 2A, and 2B, client system 110 operates as illustrated by a process 200 to restore client system 110 to a saved system state or a generic system state, according to an embodiment of the present invention.

In a process block 205, client system 110 is powered-on. A powered-on event may be the result of a user of client system 110 turning client system 110 on after being powered-off, or it may be the result of a reset of client system 110. From process block 205, client system 110 proceeds through early system initialization in a process block 210. This early system initialization includes processor 130 accessing firmware instructions 151 to execute a pre-boot program, which may include the POST test and initializing network interface 135 for rudimentary communication across network 115.

In one embodiment where firmware instructions 151 include EFI instructions, an EFI boot manager, acting as a firmware policy engine, loads EFI drivers and EFI applications during process block 210. These EFI drivers and EFI applications enable client system 110 to execute rudimentary operations without need of an operating system ("OS"), such as broadcast a dynamic host configuration protocol ("DHCP") message on network 115, execute a trivial file transfer protocol ("TFTP") across network 115, or the like.

In a process block 215, processor 130 acquires a network address of server system 105 to gain access to data storage unit 125. In one embodiment, processor 130 obtains the network address of server system 105 via a DHCP discovery broadcast over network 115. It should be appreciated that other network protocols may be implemented in accordance with embodiments of the present invention to acquire the network address of server system 105. In one embodiment where data storage unit 125 is a stand-alone network hard disk, data storage unit 125 may have a static known network address. In this embodiment, process block 215 may not be necessary as client system 110 may store the static network address and access data storage unit 125 directly.

In a process block 220, server system 105 validates a unique identifier of client system 110. In one embodiment, a media access control ("MAC") address is used to uniquely identify client system 110 on network 115. The MAC address is a unique identifier encoded into network interface 135 and used to identify client system 110 from all other client systems on network 115. In one embodiment, a globally unique identifier ("GUID") is used to uniquely identify client system 110 on network 115. The GUID combines the serial number burned into network interface 135 with a date and time to generate a 128-bit number. In one embodiment, a user of client system 110 is prompted to enter a user ID and optional password.

From process block 220, process 200 proceeds to a process block 225 where processor 130 retrieves an OS loader and loads the OS loader into volatile system memory 140. In the EFI embodiment described above, the OS loader is an EFI application that behaves like any other EFI application in that it uses memory allocated to the OS loader by firmware instructions 151 and uses EFI services and protocols loaded earlier in the system initialization of process block 210. In one embodiment, the OS loader is stored on data storage unit 125 and must therefore be loaded into volatile system memory 140 over network 115. In one embodiment, the OS loader may be retrieved from data storage unit 125 over network 115 using a member service of a preboot execution environment ("PXE"), such as TFTP. As described above, the TFTP service was loaded and made available during the early system initialization in process block 210.

Ordinarily, the OS loader will begin to boot-up the OS by loading OS boot files in a specified order. However, in a process block 230, the OS loader recognizes that a regular boot-up process should not be executed. Rather, the presence of an asserted status flag indicates to the OS loader that a resume-from-disk event should be executed. In one embodiment, this status flag is part of the OS loader and is asserted and saved just prior to a suspend-to-disk event. In one embodiment, the suspend-to-disk event is a S4 deep sleep state defined by an Advance Configuration and Power Interface ("ACPI") Specification, Revision 2.0a, Mar. 31, 2002 or later, developed in cooperation by Compaq Computer Corp., Intel Corp., Microsoft Corp., Phoenix Technologies Ltd., and Toshiba Inc.

In a process block 235, the OS loader calls the protocols loaded during early system initialization in process block 210 to access data storage unit 125 and request transfer of a system state image 160 via network 115. In one embodiment, the protocols loaded during process block 210 abstract the transfer of system state image 160 from data storage unit 125 to client system 110. Thus, in one embodiment the OS loader is unaware that system state image 160 is stored on a remote network data repository.

System state image 160 stored on data storage unit 125 contains information necessary to restore client system 110 to a saved system state of execution. In the illustrated embodiment, system state image 160 includes a volatile system memory image 161, processor state information 163, and hardware driver state information 165. Volatile system memory image 161 is a snapshot image of volatile system memory 140 during a system state in an OS runtime mode of operation. Processor state information 163 is state information necessary to return processor 130 to a processor state at the same moment the snapshot image of volatile system memory 140 was saved. In one embodiment, processed state information 163 includes information to reconfigure status flags and data registers of processor 130. Similarly, hardware driver state information 165 is state information necessary to reinitialize device drivers of client system 110 and return the device drivers to their state at the moment the snapshot image of volatile system memory 140 was saved. In one embodiment, system state image 160 includes a S4 suspend-to-disk image.

From process block 235, process 200 continues to a decision block 240 (FIG. 2B) where server system 105 determines whether a saved system state image exists for client system 110. A saved system state image is a system state image specifically saved by client system 110 to data storage unit 125 at an earlier time. A method for generating a saved system state image and saving it to server system 105 is described in detail below. Server system 105 is capable of determining whether a saved system state image exists for client system 110 by correlating the unique identifier obtained in process block 220 against a database of unique identifiers correlated to a plurality of system state images 160.

Suppose that system state image 160 is a previously saved system state image corresponding to the unique identifier obtained by server system 105 in process block 220 for client system 110. In this case, server system 105 would determine that a saved system state image does exist for client system 110 and process 200 would continue to a process block 245.

In process block 245, system state image 160 is transferred over network 115 and loaded into volatile system memory 140. In one embodiment, this transfer is effectuated using TFTP. For the sake of clarity, once system state image 160 is loaded into volatile system memory 140, it is henceforth referred to as a system state image 170, including a volatile system memory image 171, processor state information 173, and hardware driver state information 175. In one embodiment, processor state information 173 and hardware driver state information 175 are stored in buffers that are apart of volatile system memory image 171.

In a process block 250, system state image 170 (which for this discussion also represents a saved system state image) is parsed to extract processor state information 173. Once extracted, processor state information is loaded into processor 130 and processor 130 returned to the saved processor state.

In a process block 255, system state image 170 is parsed to extract hardware driver state information 175. If the hardware drivers of client system 110 do not need state information to resume execution from the saved system state, then process block 255 is skipped. On the other hand, if the hardware drivers of client system 110 do require state information to resume execution from the saved system state, then hardware driver state information 175 is extracted and provided to the hardware drivers to reinitialize.

After the hardware drivers of client system 110 have reinitialized, processor 130 has returned to the saved processor state, and volatile system memory image 171 is loaded into volatile system memory 140, client system 110 is returned to the saved system state and begins OS runtime execution (process block 260). It should be noted that client system 110 resumed OS runtime execution without executing a boot-up process after a power-off state or a reset.

Returning to decision block 240, if data storage unit 125 does not hold a saved system state image for client system 110, then a generic system state image will be provided to client system 110. For the purposes of discussion, now assume that system state image 160 is a generic system state image. In a process block 265, system state image 160 is transmitted over network 115 to client system 110 and loaded into volatile system memory 140, becoming system state image 170.

In a process block 270, system state image 170 is parsed to extract processor state information 173. Processor state information is loaded into processor 130, placing processor 130 into a generic saved processor state. In a process block 275, system state image 170 is parsed to extract hardware driver state information 175. Hardware driver state information 175 is provided to various hardware drivers within client system 110 so that the hardware drivers can initialize into generic hardware driver states. Finally, process 200 returns to process block 260 where client system 110 begins OS runtime execution from the generic system state.

It should be appreciated that process 200 is provided for explanation purposes only. Various process blocks can be reordered and/or skipped in accordance with the teachings of the present invention. For instance, process blocks 255 may be reordered to occur prior to process block 255. Similarly, the order of process blocks 270 and 275 may be switched. Additionally, one or more process blocks may be skipped. For example, depending upon the hardware components of client system 110, process blocks 255 and 275, which include initializing hardware drivers with hardware driver state information 175 may not be necessary.

Figure 3:
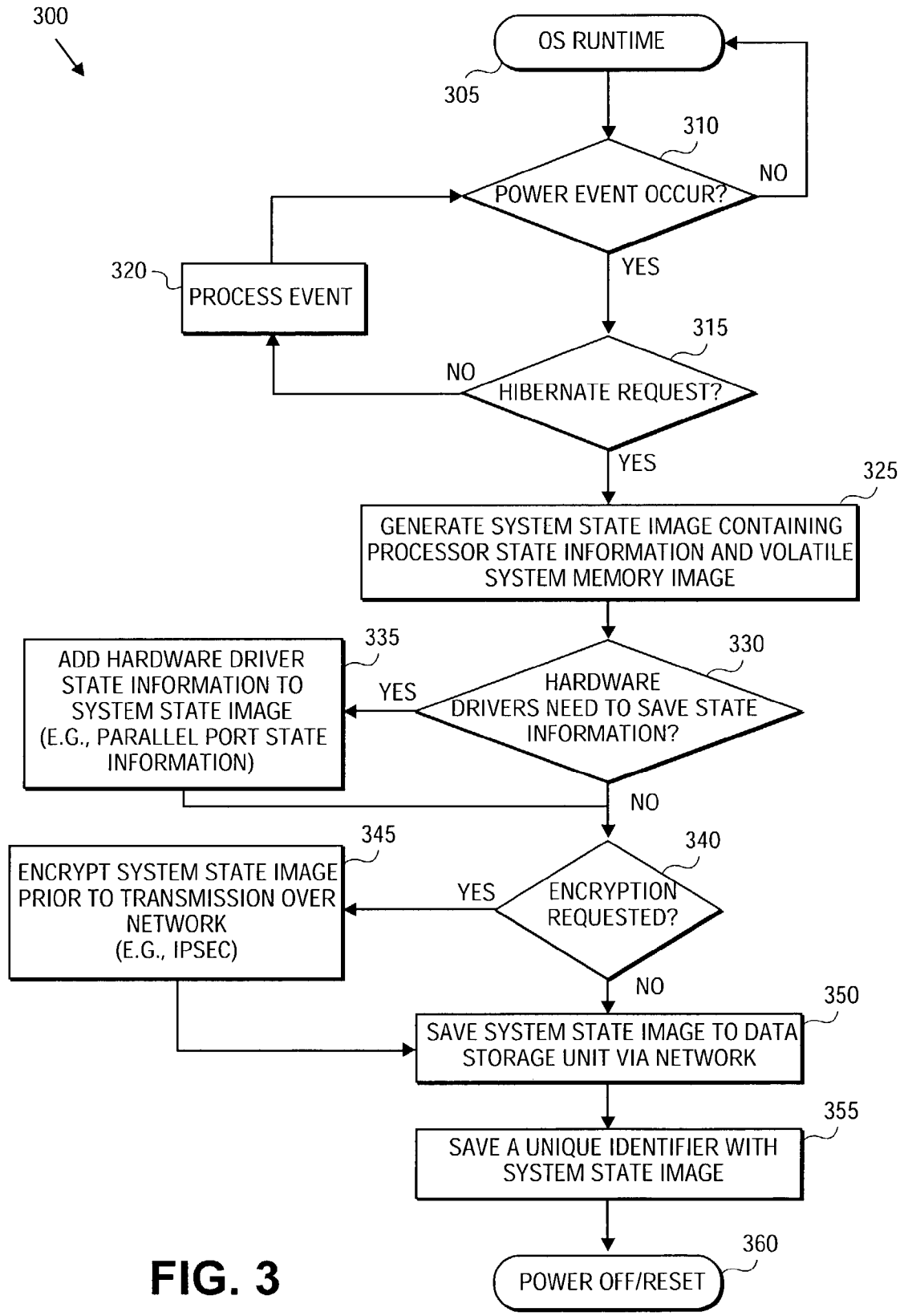
FIG. 3 is a flow diagram illustrating a method to save a system state of a client system over a network, in accordance with an embodiment of the present invention.

Turning now to FIGS. 1 and 3, one embodiment of networked system 100 operates as illustrated by a process 300 to save a system state of client system 110 to data storage unit 125 via network 115, in accordance with an embodiment of the present invention.

In a process block 305, client system 110 is operating in an OS runtime mode of operation, similar to process block 260 of FIG. 2B. In a decision block 310, it is determine whether a power event occurs. If not, client system 110 continues OS runtime execution. If a power event does occur, firmware instructions 151 will determine whether the power event is a hibernate request in a process block 315. A hibernate request is a power event where power is removed from volatile system memory 140. If the power event is not a hibernate request, in a process block 320, the power event is processed and client system 110 eventually returns to OS runtime execution in process block 305. In an embodiment where client system 110 is capable of implementing ACPI power management, a non-hibernate request power event may include an S1 sleep state where the processor is halted, an S2 sleep state where processor 130 begins execution from a processor reset vector upon wake-up, an S3 suspend to RAM sleep state, or the like.

If the power event is a hibernate request (i.e., a request that requires removal of power from volatile system memory 140), then in a process block 325 system state image 170 is generated by processor 130 and temporarily stored in volatile system memory 140. System state image 170 contains all information necessary to return client system 110 to a state of operation (i.e., saved system state) just prior to generating system state image 170. In one embodiment system state image 170 includes volatile system memory image 171 and a buffer storing processor state information 173. Processor state information 173 is generated by extracting state information from processor 130 (e.g., register contents, status flags, etc.).

In a decision block 330, client system 110 determines whether the hardware drivers of client system 110 (e.g., parallel port driver) need to save state information in order to recover from a power-off state. In a process block 335, hardware driver state information 175 is stored in buffers within system state image 170, if hardware driver state information 175 is necessary for recovery after a power-off state. Alternatively, if hardware driver state information 175 is not necessary, process 300 proceeds directly to a decision block 340.

In decision block 340, client system 110 determines whether to encrypt system state image 170, prior to transmitting system state image 170 over network 115. In one embodiment, encryption is a user selectable preference. In another embodiment, encryption is selectable by server system 105. If encryption is selected, then system state image 170 is encrypted prior to transmission over network 115 in a process block 345. In one embodiment, encryption is implemented using Internet Protocol Security ("IPsec"). IPsec provides a means to authenticate and/or encrypt data transmitted over a network at the packet level by adding authentication headers and/or encrypting the data payload of each packet.

In a process block 350, system state image 170 is stored to data storage unit 125 as system state image 160 via network 115. In one embodiment, system state image 170 is an S4 suspend-to-disk image, which instead of being saved to an internal hard disk is rerouted over network 115 via firmware instructions 151. In one embodiment, firmware instructions 151 are OS agnostic and reroute system state image 170 over network 115 without the knowledge of the particular OS running on client system 110. In one embodiment, TFTP is executed by firmware instructions 151 to transmit system state image 170 over network 115.

In a process block 355, a unique identifier is stored with system state image 160 on data storage unit 125. As described above, this unique identifier may be a GUID, a MAC address, or a user ID and optional password. Once system state image 170 is stored on data storage unit 125 and correlated with an appropriate unique identifier, client system 110 may be safely powered-off, reset, or otherwise placed in a hibernate state where power is removed from volatile system memory 140.

Diskless workstations, such as client system 110, provide the advantage of centralized control over sensitive information. Each time client system 110 is turned off, a user logs off, or a hibernate request is otherwise issued, the contents of volatile memory unit 140 are transmitted to data storage unit 125, which may be physically housed in a secure room or vault. Potentially sensitive information does not remain on individual client system hard drives. In a corporate environment, ensuring tight security over individual client system hard drives can be an elusive goal. Furthermore, purging data from a hard drive to an irretrievable point is usually more difficult then simply deleting the file and emptying the contents of a virtual recycle bin. Thus, the ability to encrypt system state image 170 prior to transmission over network 115 along with the centralized control of system state image 170 are advantageous security features of embodiments of the present invention.

Figure 4:
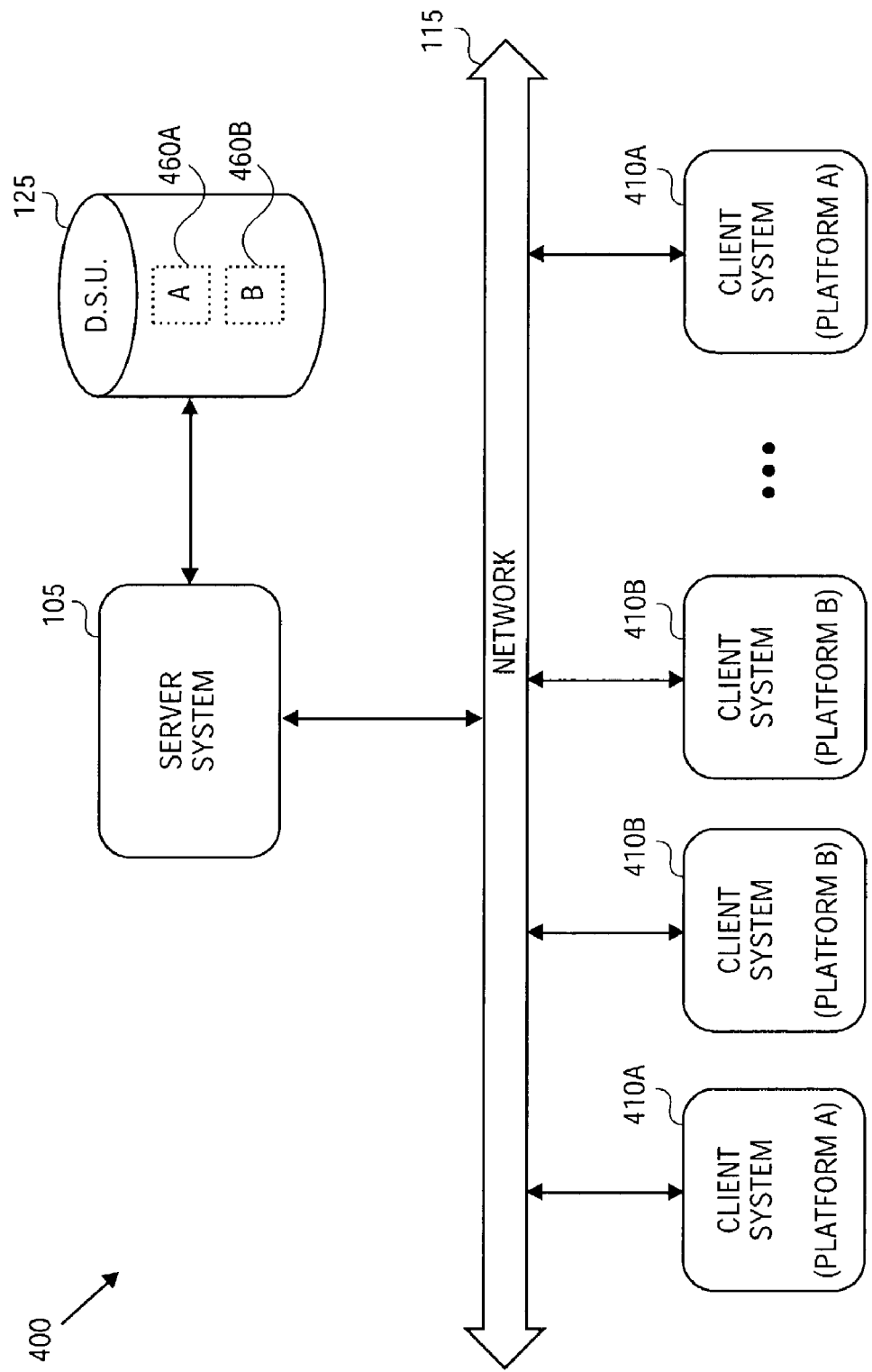
FIG. 4 is a block diagram illustrating a system including multiple client systems to save and/or restore corresponding system states over a network, in accordance with an embodiment of the present invention.

FIG. 4 is a block diagram illustrating a networked system 400 including multiple client systems 410A and 410B to save and/or restore corresponding system states over network 115, in accordance with an embodiment of the present invention. In one embodiment, networked system 400 includes server system 105, client systems 410A and 410B, network 115, and data storage unit 125. Like reference numerals of networked system 400 and networked system 100 refer to like parts. Furthermore, client systems 410A and 410B individually operate similarly as described in connection with client system 110.

As illustrated, any number of client systems 410A and 410B may be coupled to network 115 to receive generic system state images 460A and 460B, respectively. Furthermore, it should be appreciated that although only two generic system state images 460A and 460B are illustrated, data storage unit 125 can save any number of various types of generic system state images.

Generic system state images 460A and 460B, stored on data storage unit 125 correspond to the generic system state image described in connection with FIG. 2B. Generic system state images 460A and 460B further correspond to a platform type A of client systems 410A and a platform type B of client systems 410B, respectively. In addition, either one of generic system state image 460A or 460B may be loaded onto multiple corresponding client systems 410A or 410B at any given time. Platform types A and B may be defined by the constituent hardware components that make up client systems 410A and 410B. For example, platform type A may include all client systems having identical processors and a set minimum amount of volatile system memory. Other hardware and firmware aspects of client systems 410A and 410B may further distinguish its platform type. However, in general client systems having identical platform types will have identical hardware and firmware components. Thus, in one embodiment, client systems 410A are all identical and client systems 410B are all identical. However, multiple generic system state images may be available for one platform type A or B. For example, one generic system state image may simply provide a preloaded OS (e.g., Windows XP™), while another provides a different preloaded OS (e.g., Linux) along with one or more preloaded applications. Thus, generic system state images 460A and 460B place client systems 410A and 410B, respectively, into saved generic system states, without executing a boot-up process. It should further be appreciated that any number of different generic system state images can be generated to most efficiently serve the needs of various different users of client systems 410A and 410B.

Once a generic system state image is loaded onto a client system, a user of the client system is free to modify the operating state of the client system, for example, by opening and executing favored applications. The modified generic system state may then be saved back to data storage unit 125 as described in connection with process 300 illustrated in FIG. 3. Once saved, the modified generic system state image becomes a personalized saved system state image. As described in connection with process 200 illustrated in FIGS. 2A and 2B, this personalized saved system state image may be accessed at a later date, to return the client system to the saved system state, without having to execute a boot-up process of the client system. In one embodiment, only the identical client system that saved the personalized system state image to data storage unit 125 may access the personalized saved system state image. In another embodiment, any client system having a similar platform type may access the personalized saved system state image via entry of a user ID and optional password. In this manner, a network of diskless computers having persistent behavior (e.g., never reboot) may be implemented. These and additional benefits of embodiments of the present invention will be appreciated by one of ordinary skill in the art having the benefit of the present disclosure.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    prompting a user of a first client system to enter a user identifier ("ID");
    loading data stored on a data storage unit received via a network into first volatile system memory of the first client system; and
    resuming operation of the first client system based on the data stored on the storage unit without executing a boot-up process after a power-off state or after a reset,
    wherein the data comprises a first saved system state image previously modified by the user and correlated to the user ID, the first saved system state image containing information for the first client system to resume execution from a first saved system state, if the data has previously been accessed by the user,
    wherein the data comprises a generic system state image containing information for the first client system to resume execution from a generic system state, if the data has not previously been accessed by the user.

2. The method of claim 1 wherein the first saved system state image and the generic system state image include a volatile system memory image and a buffer having processor state information stored therein, the method further comprising loading the processor state information into a processor of the first client system.

3. The method of claim 1 wherein the generic system state image is correlated to a first platform type of the first client system.

4. The method of claim 1 further comprising:
    prompting the user to enter the user ID and a password associated with the user ID prior to loading the data stored on the data storage unit, wherein the data is encrypted during transmission over the network.

5. The method of claim 1, further comprising:
    saving a second saved system state image of the first client system to the data storage unit via the network, the second saved system state image indexed to the user ID within the data storage unit, the second saved system state image including information to resume operation of the first client system from a point just prior to saving the second saved system state image;
    prompting the user to enter the user ID at a second client system coupled to the network;
    loading the second saved system state image stored on the data storage unit and received via the network into a second volatile system memory of the second client system; and
    resuming operation of the second client system from a second saved system state without executing the boot-up process on the second client system.

6. The method of claim 1 wherein the loading data and the resuming operation of the first client system comprise resuming from an S4 suspend-to-disk sleep state of an advanced configuration and power interface specification.

7. The method of claim 1 wherein the first client system comprises a diskless client system.

8. A method, comprising:
    saving a system state image of a client system to a data storage unit via a network, the system state image indexed to a user identifier ("ID") stored with the system state image within the data storage unit, the system state image including information to resume operation of the client system from a point just prior to saving the system state image without executing a boot-up process after removing power to volatile system memory or after resetting the volatile system memory of the client system.

9. The method of claim 8 wherein the system state image comprises an image of the volatile system memory and a buffer having processor state information of a processor of the client system stored therein.

10. The method of claim 8, further comprising:
loading the saved system state image from the data storage unit via the network into the volatile system memory of the client system after power cycling the volatile system memory; and
resuming operation of the client system from the point just prior to saving the system state image without executing the boot-up process.

11. The method of claim 10 further comprising prompting a user of the client system to enter the user ID prior to loading the saved system state image from the data storage unit via the network.

12. The method of claim 8 wherein saving a system state image to the data storage unit is executed in conjunction with entering an S4 suspend-to-disk sleep state defined by an advanced configuration and power interface specification.

13. An article comprising a machine-accessible medium tangibly embodying instructions that, when executed by a machine, cause the machine to:
prompt a user of a client system to enter a user identifier ("ID");
load a system state image received via a network interface into a volatile system memory of a client system, the system state image containing information for the client system to resume operation from a saved system state without first executing a boot-up process after a power-off state of the client system or after a reset of the volatile system memory of the client system; and
resume operation of the client system from the saved system state,
wherein the system state image comprises a previously modified system state image correlated to the user ID, if the system state image has previously been accessed by the user,
wherein the system state image comprises a generic system state image, if the system state image has not previously been accessed by the user.

14. The machine-accessible medium of claim 13 wherein the generic system state image is correlated to a platform type of the client system.

15. The machine-accessible medium of claim 13 wherein the client system comprises a diskless client system.

16. The machine-accessible medium of claim 13 wherein the loading the system state image received via the network interface is executed in conjunction with resuming from a S4 suspend-to-disk sleep state defined by an advanced configuration and power interface specification.

17. A client system, comprising:
a processor;
volatile system memory communicatively coupled to the processor;
a network interface communicatively coupled to the processor, the network interface to communicatively couple to a network; and
a firmware unit communicatively coupled to the processor and having firmware instructions stored therein, the firmware instructions to instruct the processor to prompt a user of the client system to enter a user identifier ("ID") and to instruct the processor to load a system state image correlated to the user ID stored with the system state image and defining a saved system state into the volatile system memory, the processor to begin execution from the saved system state after a power-off state or after a reset without first executing a boot-up process, the system state image received via the network interface.

18. The system of claim 17 wherein the system state image includes an image of the volatile system memory while the client system is in the saved system state and further includes processor state information of the processor in the saved system state.

19. The system of claim 18 wherein the system state image is a generic system state image correlated to a platform type of the client system.

20. The system of claim 17 wherein the client system comprises a diskless workstation.

21. A system, comprising:
a network; and
a client computer, the client computer comprising:
a processor;
volatile system memory communicatively coupled to the processor;
a network interface communicatively coupled to the network and to the processor; and
a firmware unit communicatively coupled to the processor and having firmware instructions stored therein, the firmware instructions to instruct the processor to prompt a user of the client computer to enter a user identifier ("ID"), load a system state image correlated to the user ID stored with the system state image and defining a saved system state into the volatile system memory, the processor to begin execution from the saved system state after a power-off state without first executing a boot-up process, the system state image received via the network interface.

22. The system of claim 21 wherein the system state image includes an image of the volatile system memory while the client computer is in the saved system state and further includes processor state information of the processor in the saved system state.

23. The system of claim 22 wherein the system state image is a generic system state image correlated to a platform type of the client computer.

24. The system of claim 21, further comprising a second client computer coupled to the network, the second client computer to receive the system state image and to begin execution from the saved system state after the power-off state without first executing the boot-up process.

25. The system of claim 21 wherein the client computer comprises a diskless workstation.

* * * * *